(No Model.)

A. C. & W. F. SOMMER.
WAGON.

No. 538,435. Patented Apr. 30, 1895.

Witnesses.
Harriet Johnson
John Hager

August C. Sommer,
William F. Sommer, Inventors.
By James Sangster,
Attorney.

UNITED STATES PATENT OFFICE.

AUGUST C. SOMMER AND WILLIAM F. SOMMER, OF BUFFALO, NEW YORK.

WAGON.

SPECIFICATION forming part of Letters Patent No. 538,435, dated April 30, 1895.

Application filed February 5, 1894. Serial No. 499,074. (No model.)

*To all whom it may concern:*

Be it known that we, AUGUST C. SOMMER and WILLIAM F. SOMMER, citizens of the United States, residing in Buffalo, in the county of Erie and State of New York, have invented certain new and useful Improvements in Wagons for Drawing Heavy Loads, of which the following is a specification.

Our invention relates to wagons for carrying stone, iron or other heavy material and consists in certain improvements whereby the wagon can be turned on a small curve, and to certain details of construction whereby its strength and durability is increased, all of which will be fully and clearly hereinafter described and claimed, reference being had to the accompanying drawings, in which—

Figure 1:
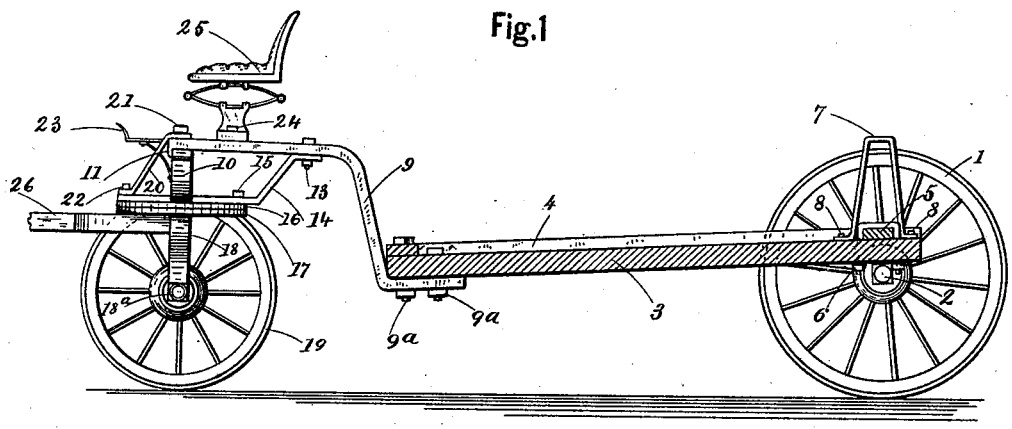
Figure 2:
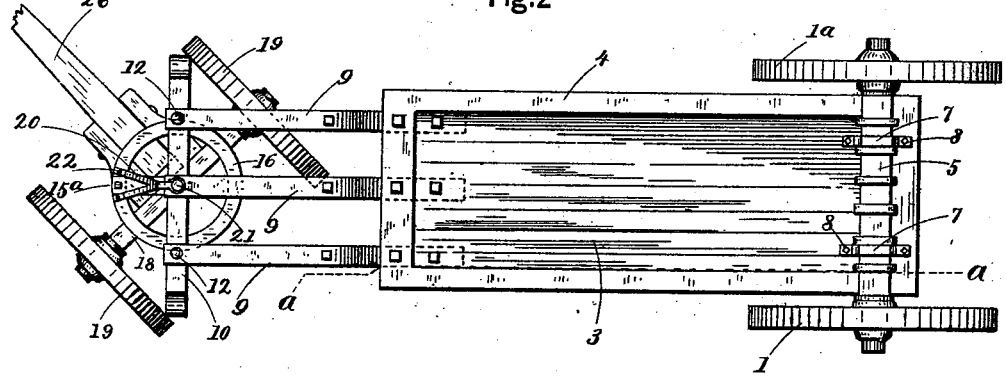

Figure 1 is a longitudinal sectional elevation on or about line $a\ a$, Fig. 2, one of the front wheels of the wagon being omitted. Fig. 2 is a top or plan view of the wagon, the seat and foot-step being omitted, so as to show the parts below it.

Referring to the drawings in detail, 1 and $1^a$, represent the rear wheels, 2 the axle, made in the usual way for heavy wagons.

The body or platform 3, of the wagon is made of hard wood securely bolted together, and is provided with a heavy surrounding frame, 4. The rear end of the platform is provided with a cross bar, 5, rigidly secured thereto by shackles or bolts 6, thereby materially increasing the strength of the portion over the rear axle. On or over the cross bar 5, are two vertical frame bars 7, rigidly secured in position by bolts, 8. To the front of the platform 3, are secured by bolts, $9^a$, three (or more) heavy angle bars 9, made of wrought iron or preferably of steel. The forward ends of the bars 9, are formed so as to hook over the top of the upper bolster 10, at the points 11, see Fig. 1, and are rigidly secured thereto by bolts, 12. On the under side of the angle bar 9, is bolted by bolts 13, a brace 14, which extends downward on an incline and then forward in substantially a horizontal direction and is secured by bolts 15 and $15^a$, to the top portion 16, of the fifth wheel.

The lower portion of the fifth wheel, 17, rests on top of the front bed piece 18, on the axle $18^a$, to which it is rigidly secured.

19 represents the front wheels. They are fastened to the axle in the usual way.

At the front of the wagon is a double brace 20, secured to the center angle bar by the king bolt, 21, which passes down through the bolsters and is secured in the ordinary way. The lower ends of the brace 20, are fastened to the front of the fifth wheel by the bolts 22.

The front of the wagon is also provided with a foot step 23, see Fig. 1, and on top of the angle bars is secured by bolts 24, a spring seat 25.

26 represents a portion of the usual wagon tongue, which is made and secured in place in the ordinary way.

The angle bars 9, it will be noticed extend forward under the platform where they are securely bolted, then upward on a slight incline, and then forward until they reach over the top of the bolster 10.

The bolster 10, it will be noticed is made much higher than usual, the object being to raise the bars 9, at this point so that in turning a short curve the front wheels will pass under them without touching.

We claim as our invention—

In a wagon for carrying heavy loads, the combination with a supporting platform provided with a surrounding frame, of frame bars bolted to the rear end of said platform and securing thereto a cross-bar carrying the rear axle, a series of angle bars, running parallel to each other, bolted to the front end of said platform and extending upward and then forward over the front bolster, and terminating in hook portions which clasp over the front edge of, and are bolted to said bolster, a brace bolted to the under side of one of the angle bars and extending downward to and across the top of the fifth wheel to which it is fastened, a double Y shaped brace also bolted to the fifth wheel extending upward, and having its top portion secured to the front end of the center angle bar, a foot step fastened to the front of the bolster, and a spring seat securely bolted to the angle bars substantially as described.

AUGUST C. SOMMER.
WILLIAM F. SOMMER.

Witnesses:
J. M. CALDWELL,
JAMES SANGSTER.